(No Model.)
W. A. LEGGO, Jr.
BACK PEDALING BRAKE.
No. 605,643. Patented June 14, 1898.
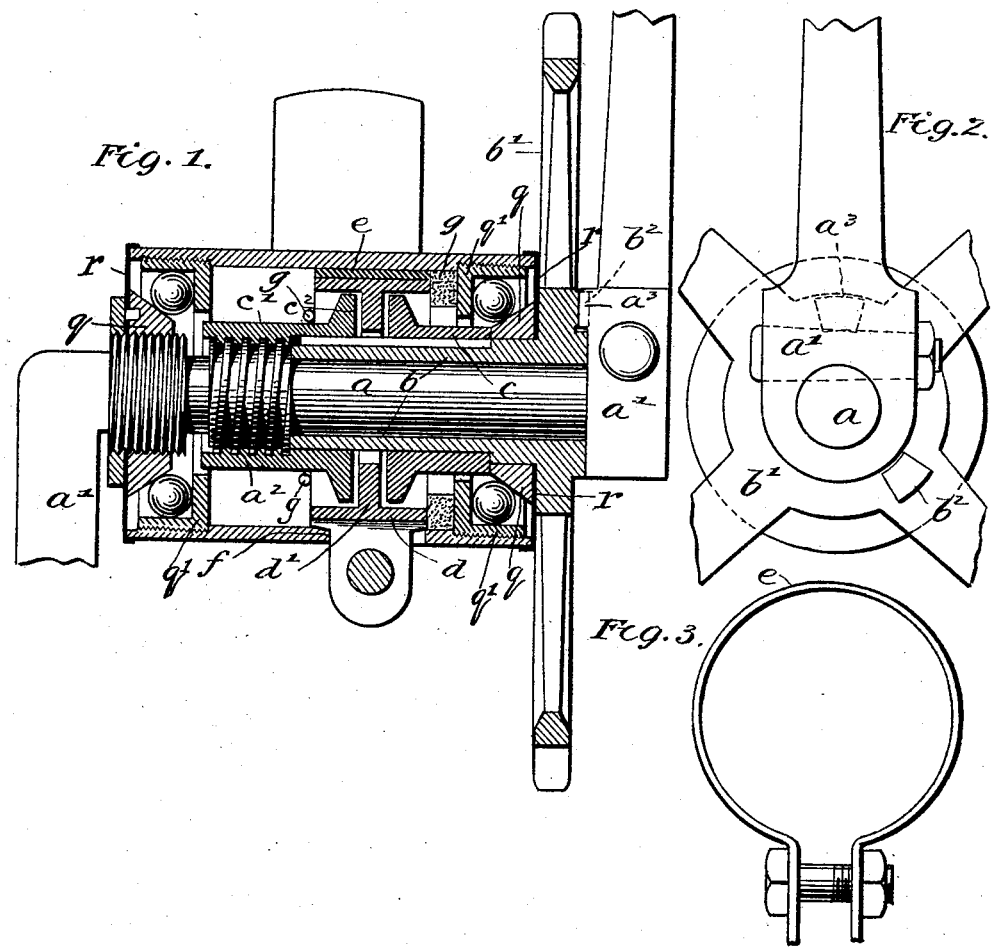
WITNESSES:
Frank S. Ober.
Harry Bailey
INVENTOR
William A. Leggo, Jr.
BY
Wm. Rosenbaum
ATTORNEY

UNITED STATES PATENT OFFICE.

WILLIAM A. LEGGO, JR., OF HARTSDALE, NEW YORK, ASSIGNOR OF ONE-FOURTH TO THE LONG ISLAND RUBBER AND CYCLE COMPANY, OF NEW YORK.

BACK-PEDALING BRAKE.

SPECIFICATION forming part of Letters Patent No. 605,643, dated June 14, 1898.

Application filed May 11, 1896. Serial No. 590,972. (No model.)

*To all whom it may concern:*

Be it known that I, WILLIAM A. LEGGO, Jr., a subject of the Queen of Great Britain, residing at Hartsdale, in the county of Westchester and State of New York, have invented certain new and useful Improvements in Vehicle-Brakes, of which the following is a full, clear, and exact description.

The object of this invention is to produce a brake for bicycles and other vehicles that will be automatic in its action to the extent that whenever a restraining or back-pedaling effort of sufficient force is exerted by the rider the brake will take effect. A further object of this invention is to produce a brake of this character that will be simple, strong, readily and cheaply made, and, further, one in which the mechanism is concealed, thereby insuring protection from dirt and giving no evidence of its presence to the eye.

The features necessary to carry out the principle of my invention may be applied to or upon any axle of a vehicle. In the detailed description which follows reference is made particularly to a bicycle; but it is to be understood that the invention is applicable to horseless carriages and any other form of vehicle where its presence would be desirable.

In the accompanying drawings, Figure 1 is a section through the crank-hanger of a bicycle, showing the parts of my brake applied thereto and in section. Fig. 2 is a side view of parts of a crank and sprocket-wheel. Fig. 3 is a side view of the brake-strap.

Referring to the drawings by letter, $a$ is the crank-axle of a bicycle, provided at its extremities, as usual, with the cranks $a'$ $a'$. Rigidly upon the axle and to one side of its center is placed an externally-threaded nut $a^2$, having a rather steep and heavy thread. This nut may be formed integrally with the shaft, if desired.

$b$ is a loose sleeve upon the axle covering the longer section thereof on one side of the nut. At its outer end it has formed upon or otherwise rigidly fixed on it the sprocket-wheel $b'$, over which the driving-chain passes. The hub of the sprocket-wheel is provided with a laterally-projecting lug $b^2$, and the inner side of the crank adjacent to the sprocket is provided with a corresponding lug $a^3$, and the power exerted by the rider in propelling the machine is transmitted through these two lugs, which form a kind of jaw-clutch between the axle and the sprocket-wheel. Upon the sleeve $b$ is rigidly placed an abutment-ring $c$, and facing this is a moving member $c'$ of a friction-clutch. This member $c'$ consists of a sleeve having an internal thread formed at one end that is in engagement with the nut $a^2$ on the axle and a friction-face $c^2$. It is keyed upon the sleeve $b$, so as to slide longitudinally thereon and to rotate therewith. Between the opposing faces of the abutment-ring $c$ and the laterally-movable member $c'$ is placed the web $d'$ of the drum $d$. The drum stands perfectly free in this position, except that it is surrounded by a metallic strap $e$, the ends of which approach each other, as shown in Fig. 3, and project through an opening $f$ in the crank-hanger, where they are joined together by an adjustable bolt through which the tension of the strap upon the drum may be regulated. The strap is prevented from rotating by interlocking with the hole in the crank-hanger, through which it passes. The drum being otherwise free except for the pressure of the strap upon it will rotate whenever the grip of the parts $c$ and $c'$ upon it overcomes the friction between the drum and the strap. The cone $q$ for the ball-bearing at the sprocket end of the hanger will be placed upon the sleeve $b$, the ball-cup $q'$ being screwed into the hanger in the usual manner. The cone $q$ at the other end is screwed upon the axle, while the cup $q'$ is screwed into the hanger. The dust-caps $r$ $r$ close the ends of the hanger. A rubber or other spring washer $g$ is inserted between the edge of the drum and the bearing to form a cushion for easing the movement of the drum toward the fixed ring $c$, and pins $g$ hold the drum squarely in place.

While the bicycle is being propelled forward the lugs $a^3$ and $b^2$ are together, and the parts $a$, $a^2$, $b$, $c$, and $c'$ all rotate together in the same direction. To apply the brake, the rider puts back pressure upon the pedals, which immediately separates the lugs $a^3$ and $b^2$, the inertia of the vehicle carrying lug $b^2$ ahead. This differential movement between the nut $a^2$ and the movable member $c'$ of the clutch causes the latter to slide in a lateral direction along the axle and to force the drum $d$ over toward the fixed ring $c$ and to clamp the web of the drum between the opposing faces of the parts $c$ and $c'$. This creates friction, inasmuch as the drum is held by the strap $e$, and consequently braking force is applied to the wheel. This may be increased by increasing the back pressure upon the pedals. Finally this back pressure overcomes the friction between the drum and the strap and the drum moves with the parts $c$ and $c'$. The wheel is now retarded by the heavy friction between the strap and the drum, which is predetermined by the adjustment of the tension of the strap. If now the wheel is not being sufficiently retarded, the rider may continue to back pedal and thus add his strength to the constant friction of the brake. At any moment in the operation of applying the brake the rider may remove his feet from the pedals and the brake will continue in action with constant friction, because, owing to the pitch of the thread on the nut $a^2$, (which may be calculated with this end in view,) there is no force at work sufficient to create the necessary differential movement between the nut and the part $c'$ to carry the latter out of engagement with the web of the drum. The function of the spring-washer $g$ is to prevent a too sudden gripping of the web of the drum. The washer slightly resists the movement of the drum toward the fixed ring. It also holds the drum out of contact with ring $c$ while the brake is off.

Having thus described my invention, I claim—

1. In a cycle, two rotating elements connected together by a screw-thread, whereby their relative movement will cause one of them to move laterally, in combination with two brake elements carried respectively by the two rotating elements, and a third brake element interposed between said two brake elements and adapted to be moved slightly in a lateral direction whereby the relative lateral movement of said rotating element will cause said third brake element to be clamped between the other two brake elements, substantially as described.

2. In a bicycle the combination of a crank-axle and cranks, a sprocket-wheel loosely mounted on the axle, interlocking abutments whereby the cranks and wheel will rotate together or differentially, at will, and a fixed screw-thread on the axle, a brake member engaging with said thread and adapted to rotate with the sprocket-wheel, but to move independently thereof to operate a brake, a drum and fixed strap surrounding the same for producing a constant friction, said brake member being arranged to engage with the drum to cause it to rotate with the sprocket-wheel and against the friction of the strap thereon.

3. In a cycle, the combination of an axle, a sleeve thereon, carrying a sprocket-wheel, a brake member feathered to the sleeve and provided with a screw-thread, a corresponding thread on the axle, a second brake member and means for rotating the axle independently of the sleeve to a limited extent for the purpose of moving the first brake member.

4. In a cycle-brake, the combination of an axle, a sleeve surrounding it and normally rotating therewith, a sliding brake member feathered to the sleeve, a corresponding brake member, means whereby the axle and the sleeve may be caused to rotate differentially to a limited extent, and a screw-thread connection between the axle and the sliding brake member whereby such differential motion will cause the sliding brake member to move longitudinally upon the axle toward or away from its corresponding member, substantially as described.

5. In a cycle, the combination of a brake element held against rotation by attachment to the frame of the cycle, and two other brake elements rotating with a rotary part of the cycle and between which the first element is interposed, driving mechanism and mechanism whereby the reversal of the driving power will cause the two rotating brake elements to clamp the fixed brake element, substantially as described.

In testimony whereof I subscribe my signature in presence of two witnesses.

WM. A. LEGGO, JR.

Witnesses:
WM. A. ROSENBAUM,
FRANK S. OBER.